US011055057B2

(12) United States Patent
Eronen et al.

(10) Patent No.: US 11,055,057 B2
(45) Date of Patent: Jul. 6, 2021

(54) APPARATUS AND ASSOCIATED METHODS IN THE FIELD OF VIRTUAL REALITY

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 240 days.

(21) Appl. No.: 16/473,032

(22) PCT Filed: Dec. 8, 2017

(86) PCT No.: PCT/FI2017/050872
§ 371 (c)(1),
(2) Date: Jun. 24, 2019

(87) PCT Pub. No.: WO2018/122449
PCT Pub. Date: Jul. 5, 2018

(65) Prior Publication Data
US 2020/0089466 A1    Mar. 19, 2020

(30) Foreign Application Priority Data

Dec. 30, 2016 (EP) ..................... 16207494

(51) Int. Cl.
*G06F 3/16* (2006.01)
*G06F 3/01* (2006.01)
*H04S 7/00* (2006.01)

(52) U.S. Cl.
CPC .............. *G06F 3/165* (2013.01); *G06F 3/011* (2013.01); *H04S 7/303* (2013.01)

(58) Field of Classification Search
CPC ........... G06F 3/165; G06F 3/011; H04S 7/303
See application file for complete search history.

(56) References Cited

U.S. PATENT DOCUMENTS 5,771,041 A    6/1998  Small
9,197,974 B1   11/2015 Clark et al.
(Continued)

FOREIGN PATENT DOCUMENTS

GB    2540175 A    1/2017
GB    2540199 A    1/2017
(Continued)

OTHER PUBLICATIONS

Extended European Search Report received for corresponding European Patent Application No. 16207494.2, dated Jul. 7, 2017, 9 pages.

(Continued)

*Primary Examiner* — Fan S Tsang
*Assistant Examiner* — David Siegel
(74) *Attorney, Agent, or Firm* — Nokia Technologies Oy

(57) ABSTRACT

In respect of virtual reality content of a scene for presentation to a user in a virtual reality (VR) space, the VR content comprising spatial audio captured by an audio capture device at an audio capture location, and based on a virtual location of a user relative to a virtual audio capture location in the virtual reality space that corresponds to the audio capture location; providing for audible presentation of the spatial audio when the virtual location is within a threshold distance with the spatial audio effect such that the one or more sounds are perceived to originate from one or more directions in the virtual reality space in corresponding to the directional information; and providing for audible presentation of the spatial audio when the virtual location is beyond the threshold distance such the one or more sounds are audibly presented with an ambient audio effect.

20 Claims, 4 Drawing Sheets

700 — based on a virtual location of a user in the virtual reality space relative to a virtual audio capture location in the virtual reality space that corresponds to the audio capture location in the scene 701 — providing for audible presentation of the spatial audio when the virtual location is within a threshold distance of the virtual audio capture location with the spatial audio effect such that the one or more sounds are perceived to originate from one or more directions in the virtual reality space in corresponding to the directional information; and providing for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

(56) References Cited

U.S. PATENT DOCUMENTS

| | | | |
|---|---|---|---|
| 10,496,358 B1* | 12/2019 | Hirst | H04N 21/233 |
| 2003/0033150 A1 | 2/2003 | Balan et al. | |
| 2016/0161594 A1 | 6/2016 | Benattar | |
| 2019/0174246 A1* | 6/2019 | De Bruijn | H04R 3/12 |
| 2019/0335288 A1* | 10/2019 | Latypov | H04S 3/008 |

FOREIGN PATENT DOCUMENTS

| | | |
|---|---|---|
| JP | 2013250838 A | 12/2013 |
| JP | 2015170926 A | 9/2015 |

OTHER PUBLICATIONS

"Report of the DVB CM Study Mission on Virtual Reality (CM1697)", DVB Organization, Oct. 2016, pp. 1-128.

International Search Report and Written Opinion received for corresponding Patent Cooperation Treaty Application No. PCT/FI2017/050872, dated Mar. 9, 2018, 15 pages.

Notice of Allowance received for corresponding Japanese Patent Application No. 2019-535798, dated Jul. 20, 2020, 3 pages of office action and no page of Translation available.

Office action received for corresponding European Patent Application No. 16207494.2, dated Aug. 4, 2020, 19 pages.

\* cited by examiner

Figure 7

700 — based on a virtual location of a user in the virtual reality space relative to a virtual audio capture location in the virtual reality space that corresponds to the audio capture location in the scene 701 — providing for audible presentation of the spatial audio when the virtual location is within a threshold distance of the virtual audio capture location with the spatial audio effect such that the one or more sounds are perceived to originate from one or more directions in the virtual reality space in corresponding to the directional information; and providing for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

Figure 8

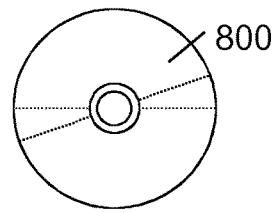

800

APPARATUS AND ASSOCIATED METHODS IN THE FIELD OF VIRTUAL REALITY

RELATED APPLICATION

This application was originally filed as Patent Cooperation Treaty Application No. PCT/FI2017/050872 filed Dec. 8, 2017 which claims priority benefit to EP Patent Application No. 16207494.2, filed Dec. 30, 2016.

TECHNICAL FIELD

The present disclosure relates to the field of virtual reality. Associated methods, computer programs and apparatus is also disclosed. Certain disclosed aspects/examples relate to portable electronic devices.

BACKGROUND

The presentation of spatial audio that is perceived as originating from particular directions such that it corresponds to the visual content presented to a user may be important.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
 at least one processor; and
 at least one memory including computer program code,
 the at least one memory and the computer program code configured to, with the at least one processor, cause the apparatus to perform at least the following:
 in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location,
 based on a virtual location of a user in the virtual reality space relative to a virtual audio capture location in the virtual reality space that corresponds to the audio capture location in the scene;
 provide for audible presentation of the spatial audio when the virtual location is within a threshold distance of the virtual audio capture location with a spatial audio effect such that the one or more sounds are perceived to originate from one or more directions in the virtual reality space corresponding to the directional information; and
 provide for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

In one or more embodiments, the ambient audio effect is configured to audibly present the one or more sounds of the spatial audio such that they are perceived as originating from one of all directions around the user and a plurality of directions. In one or more examples, the spatial audio with the ambient audio effect is presented such that it is perceived as pervasive background audio.

In one or more embodiments, the VR content includes individual audio comprising audio from a particular source of sound in the scene wherein the spatial audio also includes, at least in part, audio from the same particular source of sound in the scene, the apparatus caused to provide for audible presentation of the individual audio at a higher volume relative to the spatial audio when the virtual location is beyond the threshold distance relative to when the virtual location is within the threshold distance.

In one or more embodiments, the individual audio is associated with particular source location information that defines the location of the particular source of sound in the scene and, based on said particular source location information and a current viewing direction and the virtual location of the user, the individual audio is provided for audible presentation with the spatial audio effect configured to position the audio in the virtual reality space such that it is perceived to originate from a direction in the virtual reality space corresponding to the particular source location information.

In one or more embodiments, the threshold distance defines a transition region comprising a region of virtual reality space in which the ratio of spatial audio provided for audible presentation with the spatial audio effect and the spatial audio provided for audible presentation with the ambient audio effect is varied as a function of distance from the virtual audio capture location.

In one or more embodiments, a gain applied to the spatial audio provided for audible presentation with the spatial audio effect is decreased with increasing distance of the virtual location of a user from the virtual audio capture location.

In one or more embodiments, a gain applied to the spatial audio provided for audible presentation with the ambient audio effect is increased with increasing distance of the virtual location of a user from the a virtual audio capture location.

In one or more embodiments, the spatial audio effect uses one of a head related transfer function and vector-base amplitude panning to audibly present the spatial audio.

In one or more embodiments, the apparatus is caused to provide for audible presentation of the spatial audio when the virtual location is beyond the threshold distance from the virtual audio capture location such that all of the one or more sounds captured by the spatial audio capture device are audibly presented:
 i) without the spatial audio effect and
 ii) with the ambient audio effect such that said sounds are perceived without a specific direction of origin.

In one or more embodiments, the apparatus is caused to provide for audible presentation with the spatial audio effect of the one or more sounds of the audio outside the subset where the directional information of said one or more sounds is indicative of a direction within a direction threshold of a direction extending from the virtual location of the user and the virtual audio capture location when the virtual location is beyond the threshold distance from the virtual audio capture location.

Thus, in one or more examples, the spatial audio effect can still be used for sounds that originate from a location on the opposite side to the virtual audio capture location (defined by the threshold above) to the virtual location of the user, because the direction towards the source of those sounds is still valid at the user's virtual location. However, sounds from other directions may not correspond correctly to the visual location of the source of the sound in the VR content and therefore, for those sounds, the ambient audio effect is used.

In a second aspect there is provided a method, the method comprising, in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location, based on a virtual location of a user in the virtual reality space relative to a virtual audio capture location in the virtual reality space that corresponds to the audio capture location in the scene;

providing for audible presentation of the spatial audio when the virtual location is within a threshold distance of the virtual audio capture location with the spatial audio effect such that the one or more sounds are perceived to originate from one or more directions in the virtual reality space in corresponding to the directional information; and providing for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

In a third aspect there is provided a computer readable medium comprising computer program code stored thereon, the computer readable medium and computer program code being configured to, when run on at least one processor, perform the method of:

in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location, based on a virtual location of a user in the virtual reality space relative to a virtual audio capture location in the virtual reality space that corresponds to the audio capture location in the scene;

providing for audible presentation of the spatial audio when the virtual location is within a threshold distance of the virtual audio capture location with the spatial audio effect such that the one or more sounds are perceived to originate from one or more directions in the virtual reality space in corresponding to the directional information; and providing for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

In a further aspect there is provided an apparatus, the apparatus comprising means configured to;

in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location, based on a virtual location of a user in the virtual reality space relative to a virtual audio capture location in the virtual reality space that corresponds to the audio capture location in the scene;

provide for audible presentation of the spatial audio when the virtual location is within a threshold distance of the virtual audio capture location with a spatial audio effect such that the one or more sounds are perceived to originate from one or more directions in the virtual reality space corresponding to the directional information; and provide for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

The present disclosure includes one or more corresponding aspects, examples or features in isolation or in various combinations whether or not specifically stated (including claimed) in that combination or in isolation. Corresponding means and corresponding functional units (e.g., function enabler, point of view determiner, display device, audio renderer) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 7 shows a flowchart illustrating an example method; and

FIG. 8 shows a computer readable medium.

DESCRIPTION OF EXAMPLE ASPECTS

Figure 1:
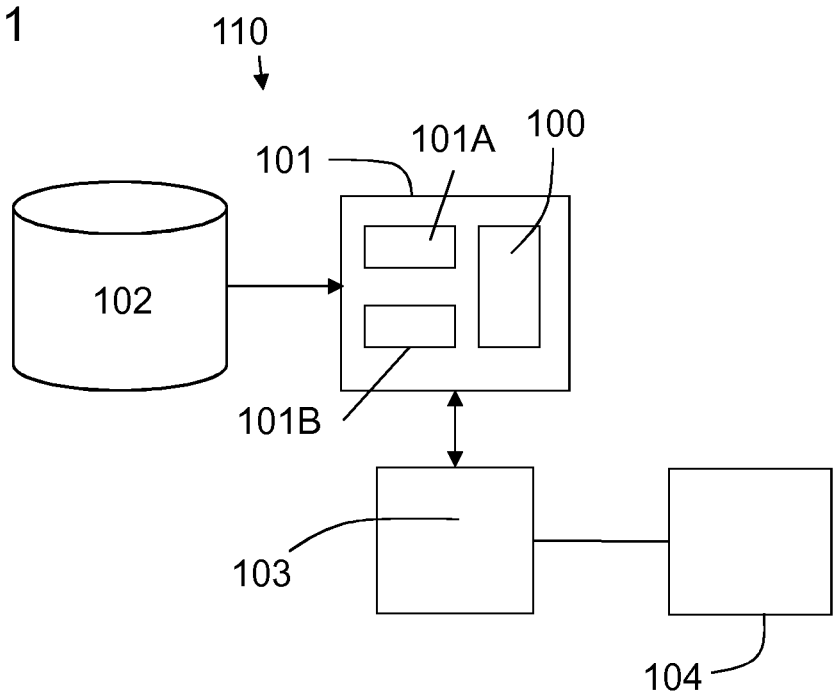
FIG. 1 illustrates an example embodiment of an apparatus.

Virtual reality (VR) may use a VR display comprising a headset, such as glasses or goggles or virtual retinal display, or one or more display screens that surround a user to provide the user with an immersive virtual experience. A virtual reality apparatus, using the VR display, may present multimedia VR content representative of a scene to a user to simulate the user being virtually present within the scene. The virtual reality scene may replicate a real world scene to simulate the user being physically present at a real world location or the virtual reality scene may be computer generated or a combination of computer generated and imaged real world multimedia content. The virtual reality scene may be provided by a panoramic video (such as a panoramic live broadcast or pre-recorded content), comprising a video having a wide or 360° field of view (or more, such as above and/or below a horizontally oriented field of view). The user may be presented with a VR view of the scene and may, such as through movement of the VR display (i.e. headset), move the VR view to look around the scene at the VR content.

Accordingly, a three-dimensional virtual reality space may be provided in which the virtual reality content is displayed and in which the user can look around and, optionally, explore by translation, for example, through the VR space.

The VR content provided to the user may comprise live or recorded images of the real world, captured by a VR content capture device, for example. A VR content capture device may be configured to capture VR content for display to one or more users. A VR content capture device may comprise one or more cameras and one or more (e.g. directional and/or ambient) microphones configured to capture the surrounding visual and aural scene from a point of view. An example VR content capture device is a Nokia OZO camera of Nokia Technologies Oy. Thus, a musical performance may be captured (and recorded) using a VR content capture device, which may be placed on stage, with the performers moving around it or from the point of view of an audience member. In each case a consumer of the VR content may be able to look around using the VR display of a VR apparatus to experience the performance at the point of view of the capture location as if they were present.

As the VR scene is typically spatially larger than a portion a user can view with the VR view presented on the VR display at any one time, the VR apparatus may provide for panning around of the VR view in the VR scene based on movement of a user's head or eyes. For example, the field of view in the horizontal plane of a VR display may be about 120° but the VR content may provide 360° video imagery. Thus, the field of view of the VR view provided by the VR display may be less than the total spatial extent of the VR content.

In one or more examples, the VR content may be such that a user may change the viewing direction of their VR view to look around the VR scene but the location of their point of view is outside their control and dependent on the point of view of the VR content capture device location when it captured the scene. In one or more examples, sometimes referred to as "free viewpoint" VR, the user is able to explore the VR space. The explorable VR space may be computer generated, such as rendered from 3-dimensional models, or may be generated from visual imagery of a scene from one or more VR content capture devices or a combination of the two. Thus, free viewpoint VR content may be such that a user may freely control the location of their point of view in the VR space as well as the viewing direction of their VR view to look around the VR space. When the user is at a virtual location in the VR space that corresponds to where the VR content was captured in the scene, then the user may be provided with the VR content from that content capture device. When the user virtually moves away from the VR content capture device location, the VR apparatus may provide for display of VR content from a different VR content capture device at a different location or provide for display of a combination of imagery from multiple content capture devices to simulate the view the user may see at their current virtual location. It will be appreciated that various techniques exist for simulating the view a user may receive at a point in the virtual reality space based on VR content captured at one or more VR content capture locations in a scene including: use of VR content from VR content capture devices at different locations; use of combinations of imagery from VR content capture devices at different locations; interpolation of visual imagery from one or more VR content capture devices at different locations; use of computer models of the scene to simulate a point of view location between VR content capture devices.

The virtual reality content may be provided with spatial audio having directional properties, such that the audio is perceived to originate from a point in the VR space, which may be linked to the imagery of the VR content. The spatial positioning of the audio may be provided by the degree to which audio is presented to each channel of a multichannel audio arrangement, as well as 3D audio effects, such as those that utilise a head related transfer function (HRTF) or vector-base amplitude panning (VBAP) to create a spatial audio space or "aural scene" in which audio can be positioned for presentation to a user.

The apparatus 100 may form part of or be in communication with a VR apparatus 101 for presenting VR content to a user. A store 102 is shown representing the VR content stored in a storage medium or transiently present on a data transmission bus as the VR content is captured and received by the VR apparatus 101. The VR content may be captured by at least one VR content capture device and may be live or recorded. A user may use a VR head set 103 or other VR display to view the VR content. The VR display 103, or more generally the VR apparatus 101, may be associated with headphones 104 or other multi-channel sound generating arrangement for presentation of spatial audio and ambient audio which does not have a perceived origin direction. In other embodiments, the VR apparatus 101 may be remote from the apparatus 100, and may be connected via a network, such as the Internet. The VR apparatus 101 may form part of the store 102 and, in one or more examples, transmit the VR content to the VR display 103 and headphones 104. In other embodiments, the VR apparatus 101 may be integral with the VR display 103 and/or headphones 104 and, as such, the apparatus 100 may be integral therewith or remote and in communication with the VR apparatus 101.

In this embodiment the apparatus 100 mentioned above may have or may be connected to only one processor 101A and one memory 101B but it will be appreciated that other embodiments may utilise more than one processor and/or more than one memory (e.g. same or different processor/memory types). Further, the apparatus 100 may be an Application Specific Integrated Circuit (ASIC). The apparatus 100 may be separate from and in communication with the VR apparatus 101 or, as in FIG. 1, may be integrated with the VR apparatus 101. The apparatus 100 and VR apparatus 101 may share the processor 101A and/or memory 101B or may be provided with separate processors and/or memories.

The processor 101A may be a general purpose processor dedicated to executing/processing information received from other components, such as the VR apparatus 101 and the apparatus 100, in accordance with instructions stored in the form of computer program code on the memory. The output signalling generated by such operations of the processor is provided onwards to further components, such as to the VR apparatus 101 for display of the required imagery described in more detail below.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor 101A and the memory 101B are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
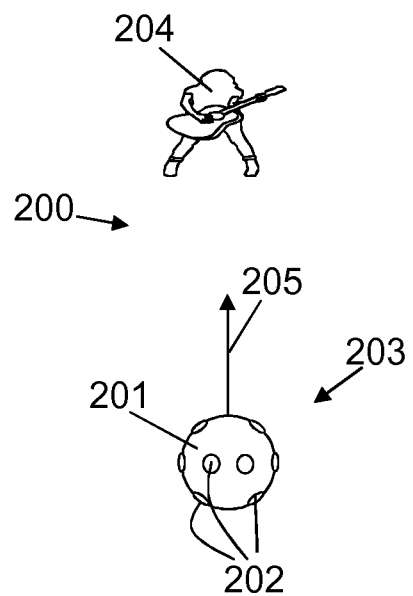
FIG. 2 illustrates an example real world scene of which VR content is captured including an audio capture device.
Figure 3:
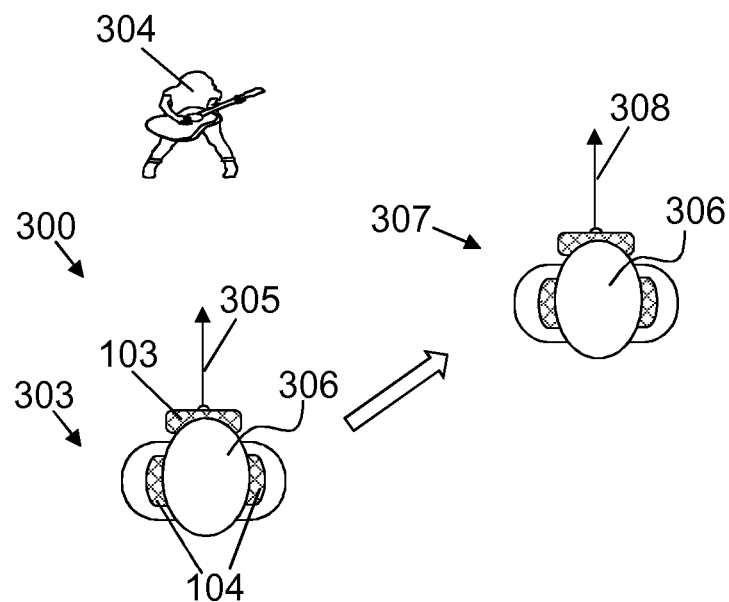
FIG. 3 illustrates an example virtual reality space based on the scene of FIG. 2 representing a source of audio and the virtual location of the user.

FIGS. 2 and 3 illustrate a potential difficulty of presenting spatial audio, especially in free viewpoint virtual reality.

FIG. 2 shows a plan view of real world scene 200. The scene 200 includes an audio capture device 201, which may comprise a Nokia OZO VR camera. The audio capture device 201, in this example, also captures VR visual imagery of the scene 200 and includes a plurality of cameras 202 pointing in different directions for this purpose. Accordingly the audio capture device 201 or, more generally, the VR camera 201 captures VR content of the scene. The audio capture device 201 is physically located at an audio capture location 203 in the scene comprising the "listening" location in the scene 200 from which the sounds of the scene are captured.

The scene 200 also includes a musician 204 comprising a source of audio for capture by the audio capture device 201. The spatial audio captured by the audio capture device 201 includes information to identify the direction 205 towards the sounds made by the musician 204. Accordingly, the VR content generated by the VR camera 201 will include directional information that indicates that the sounds of the musician 204 were captured from the direction 205 in the scene 200. It will be appreciated that in other examples, the audio capture device 201 may not be part of a VR camera and may be physically separate and/or located at a different position to a VR camera in the scene 200. The audio capture device 201 may comprise a microphone array comprising a plurality of directionally focussed microphones. The audio capture device 201 may be associated with a positioning system for locating the position of tags associated with the audio capture device and one or more sound sources in the scene, to provide or assist with the capture of location information of the audio capture devices and audio sources in the scene 200.

It will be appreciated that the scene may include one or more audio sources, each generating sound and therefore the spatial audio may comprise audio from the scene with directional information defining one or more directions towards one or more sources of one or more sounds from the audio capture location 203.

FIG. 3 shows a virtual reality space 300 comprising a virtual three dimensional environment which represents the real world space of the scene 200. The VR content is presented in the virtual reality space 300 such that the visual imagery of the VR content is presented for viewing. Accordingly, imagery 304 of the musician 204 is shown, along with any other background visual imagery (not shown for simplicity).

The VR space and VR imagery provided by the VR apparatus 101 is, in this example, free viewpoint VR and therefore the user may change their direction of view as well as the location of their point of view in the VR space 300. The location of the point of view of the user is illustrated by a plan view of the user 306 wearing a VR display headset 103 for displaying a VR view of the VR space 300 dependent on where the user is looking in space and headphones 104 for presenting spatial audio (and ambient audio) to the user 306.

FIG. 3 shows a user 306 at two different point of view locations or "viewing positions" 303, 307 in the VR space 300. In the first viewing position 303 the user 306 is viewing the VR content from a corresponding virtual location in the VR space 300 to the audio capture location 203, i.e. in front of the imagery 304 of the musician 204. Thus, on comparison of FIGS. 2 and 3 it will be realised that the viewing position 303 is substantially equivalent to the audio capture location 203. The spatial audio presented to the user 306, based on the directional information, correctly results in the sounds of the musician 204 being heard from a direction 305 corresponding to the location of the visual imagery 304 of the musician in the VR space 300.

In the second viewing position 307, the spatial audio presented to the user, if the spatial audio is continued to be provided in accordance with the directional information, would be heard from direction 308, which, incorrectly, does not correspond to a direction towards the imagery 304 of the musician 204 from the second viewing position 307. This may be confusing as the "aural scene" does not correspond to VR visual imagery at the second viewing position 307 when the user has virtually moved away from a location 303 in the VR space 300 that corresponds to the audio capture location 203.

Figure 4:
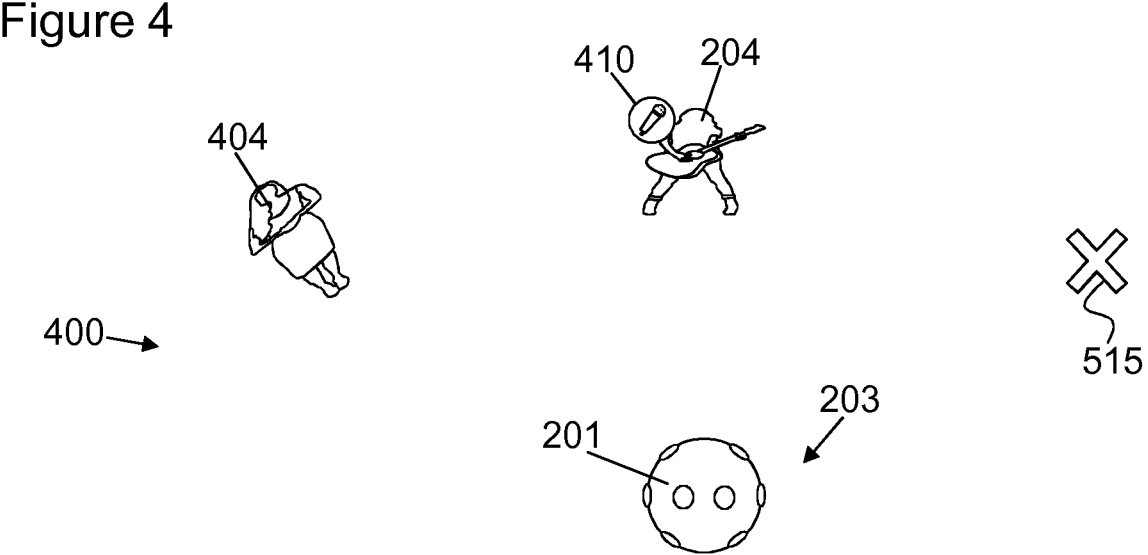
FIG. 4 illustrates a further example real world scene of which VR content is captured including an audio capture device and two audio sources.
Figure 5:
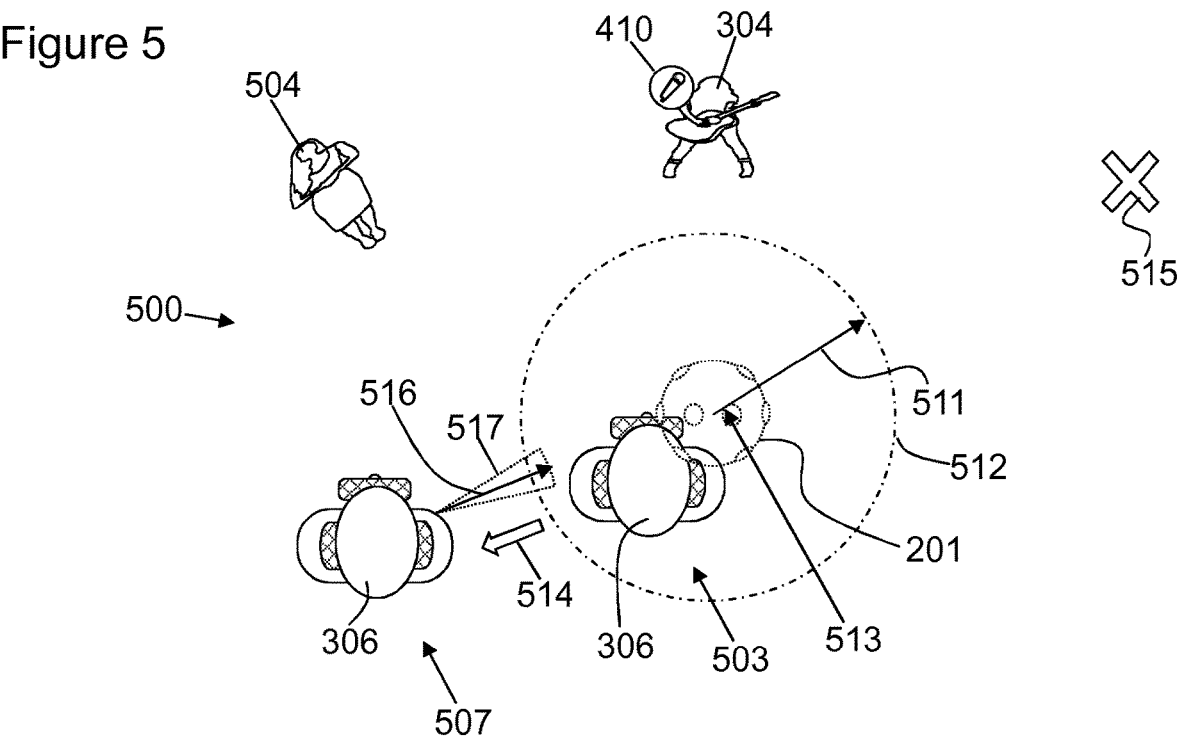
FIG. 5 illustrates an example virtual reality space based on the scene of FIG. 4 showing the virtual representations of the audio sources and the virtual location of the user relative to a threshold distance and illustrating the function of the apparatus.

FIGS. 4 and 5 illustrate an example of how the apparatus may be configured to operate.

FIG. 4 shows a similar real world scene to FIG. 2 and the same reference numerals have been used. However, in FIG. 4 there is an additional singer 404 in the scene 400 comprising a source of sounds for capture, with direction information by the audio capture device 201. In this FIG. 4, the musician 204 also has a lavalier microphone 410 on their person. The microphone 410 may be considered to capture individual audio of the musician 204 because it is associated with them by being physically attached to them or configured to track the musician 204. It will be appreciated that sounds in the scene 400 may be pervasive and therefore the lavalier microphone 410 may capture sounds from other audio sources in the scene 400, but it is primarily considered to capture audio from the musician 204.

Thus, in this example, the VR content captured of the scene may include spatial audio captured by the spatial audio capture device 201 from the audio capture location 203 comprising the sound from the musician 204 with directional information and the sound from the singer 404 with directional information. The VR content may further comprise the individual audio from the musician 204 captured by the lavalier microphone 410.

As before with FIGS. 2 and 3, FIG. 5 shows the virtual reality space 500 that represents the real world scene 400 of FIG. 4. Thus, imagery 304 of the musician 204 is provided for display as well as imagery 504 of the singer 404. The location, in the VR space 500, corresponding to the audio capture location 203, termed "virtual audio capture location" 513 is illustrated by the audio capture device 201 shown in dashed lines. FIG. 5 also shows the user 306 at two different point of view locations or "viewing positions" in the VR space 500. In the first viewing position 503 the user 306 is viewing the VR content from a virtual location in the VR space 300 within a threshold virtual distance 511 and illustrated by dashed circle 512 defining a region around the virtual audio capture location corresponding to the audio capture location 203. In the second viewing position 507, the user 306 is viewing the VR content from a virtual location in the VR space 300 beyond the threshold virtual distance 511.

In this example, the apparatus 100 is caused to provide for audible presentation of the spatial audio in different ways based on the virtual location 503, 507 of the user 306 in the virtual reality space 500 relative to the virtual audio capture location 503 in the virtual reality space that corresponds to the audio capture location 2011 in the scene 400.

In particular, the apparatus 100 is configured to provide for audible presentation of the spatial audio from the audio capture device 201 when the virtual location 503 is within a threshold distance of the virtual audio capture location 513 with a spatial audio effect such that the one or more sounds (from musician 204 and signer 404) are perceived to originate from one or more directions in the virtual reality space 500 corresponding to the directional information. Thus, when the virtual location 503 of the user is near the virtual audio capture location (within the threshold), the spatial audio is audibly presented as spatial audio, with the directional information utilised to provide the perception of direction in the sound to correspond to the location of the imagery 304 of the musician and the imagery 504 of the singer.

When the virtual location 507 is beyond the threshold distance 511 from the virtual audio capture location 513, the apparatus 100 is configured to provide for audible presentation of the spatial audio such that at least a subset of the one or more sounds are audibly presented without the spatial audio effect and with an ambient audio effect such that said sounds are perceived without a specific direction of origin. Thus, when the virtual location 507 of the user is spaced from the virtual audio capture location (above the threshold), at least some of the sounds that make up the spatial audio are audibly presented not as spatial audio, but as ambient audio. Thus, the audio content of the spatial audio is used but the directional information associated therewith may be, at least in part, ignored.

Thus, in one or more examples, where a user is free to explore a virtual reality space, it is desirable for the aural scene they hear to be consistent with the visual, virtual scene they are presented with from their virtual location 503, 507. The VR content may not include microphones or other audio capture devices at every possible location in the scene and therefore rendering the aural scene may be difficult, particularly when the audio comprises spatial audio from specific audio capture locations. The presentation of spatial audio from a particular audio capture device such that the directional information thereof is rendered by way of the spatial audio effect when the user is virtually near the audio capture location and with the ambient audio effect when the user is virtually far from the audio capture location may be advantageous. This may enable use of the spatial audio even when the user's virtual location would make the directional information with which it is associated inappropriate to use. One or more of the virtual location of the user, the virtual audio capture location, the distance between the virtual audio capture location and the user's location may be reported by the VR apparatus 101 or calculated by the apparatus 100. The virtual audio capture location may be determined from information associated with the VR content.

Thus, at virtual location 503, the user may be audibly presented with the sounds of the musician 204 captured by audio capture device 201 as spatial audio, i.e. with the spatial audio effect, such that the sound is perceived to originate from in front of the user 306 in accordance with the imagery 304. The audio from the individual audio microphone 410 may be audibly presented and audio mixed with the spatial audio in a first ratio. The user 306 may be audibly presented with the sounds of the singer 404 captured by audio capture device 201 as spatial audio, i.e. with the spatial audio effect, such that the sound is perceived to originate from approximately 45° to the user's left in accordance with the imagery 504.

At virtual location 507, the user may be audibly presented with the sounds of the musician 204 captured as spatial audio by audio capture device 201 but as ambient audio, i.e. with the ambient audio effect, such that the sound is not perceived to originate from a particular direction but is perceived as ambient or "omnidirectional audio". The audio from the individual audio microphone 410 may be audibly presented and audio mixed with the spatial audio that is audibly presented as ambient audio in a second ratio different to the first ratio. The user 306 may be audibly presented with the sounds of the singer 404 captured by audio capture device 201 as ambient audio, i.e. with the ambient audio effect, such that the sound is not perceived to originate from a particular direction but is perceived as ambient or omnidirectional audio.

The spatial audio effect may provide for audible presentation of the spatial audio using one of a head related transfer function (HRTF) and vector-base amplitude panning (VBAP) to audibly present the spatial audio such that the sounds are perceived as originating from discrete directions in the VR space 500 corresponding to the directions to the audio sources 204, 404 in the scene 400. It will be appreciated that spatial audio may be rendered for audible presentation to the user in other ways and using different techniques. While we list HRTF and VBAP as examples of the spatial audio effect, the spatial audio effect may be considered to include any technique for rendering spatial audio as it is intended to be heard, i.e. with directional sound.

The ambient audio effect may be configured to audibly present the one or more sounds of the spatial audio such that they are perceived as originating from all directions around the user or, in some examples, a wider range of directions than with the spatial audio effect. Thus, the audio content of the spatial audio is used but the head related transfer function or vector-base amplitude panning may not be used to present the directionality of the sounds in accordance with the directional information.

In one example implementation, the spatial audio capture device may comprise multiple microphones and may therefore capture multi-microphone signals. The multi-microphone signals captured by the spatial audio capture device may be analysed to determine one or more signals representing direct sounds, that is, sounds which arrive directly from sound sources to the listener. Correspondingly, the multi-microphone signals captured by a spatial audio capture device may be analysed to determine one or more signals representing ambient or reverberant sounds, that is, sounds which do not have any apparent direction of arrival (are ambient) or which are reflections through walls or general reverberation. Presenting directional spatial audio may involve rendering the one or more signals representing direct sounds with a spatial audio effect comprising, for example, HRTF rendering or VBAP panning. Presenting ambient sounds of the spatial audio may involve rendering the one or more signals representing ambient sounds with an ambient audio effect, the effect comprising audible presenting without HRTF rendering or VBAP panning. The complete spatial audio scene may be presented by mixing the rendered direct and ambient signals. Thus, the spatial audio may comprise audio of sounds from specific directions as well as ambient sounds without specific directions. The apparatus 100 may be configured to present at least some of the audio of sounds from specific directions in the same way as the ambient sounds when the virtual location of the user is beyond the threshold distance.

The first ratio and the second ratio may be set to present the individual audio with a higher volume relative to the volume of the spatial audio when the user is virtually located further away than the threshold distance 511 compared with when the user is virtually located within the threshold distance 511 from the virtual audio capture location 513.

In one or more examples, the location of the microphone 410 that captures individual audio may be known, such as from a positioning system that monitored the scene using locating tags, as will be known to those skilled in the art. With such particular source location information, comprising the audio capture location of the individual audio, the apparatus 100 may be, based on the current viewing direction of the user, configured to audibly present the individual audio with the spatial audio effect configured to position the audio in the virtual reality space 500 such that it is perceived to originate from a direction in the virtual reality space corresponding to the particular source location information, i.e. in accordance with the position of the imagery 304 of the musician 204. Thus, because sound of the musician 204 dominates the individual audio, it may be placed in the aural scene by way of the spatial audio effect in accordance with the particular source location information.

In one or more examples, as the presentation of the spatial audio with the spatial audio effect is removed from audible presentation (when moving beyond the threshold distance 511) the presentation of the individual audio with the spatial audio effect to provide more directionality may be increased.

In the above example, the threshold distance 511 may define the transition point between presenting spatial audio as spatial audio or presenting spatial audio as ambient audio. However, in other examples, the transition between presenting spatial audio as spatial audio or as ambient audio may be less abrupt and occur over a transition region defined by the threshold distance 511. Thus, in one or more examples, the audio content of the spatial audio may be presented, completely, as spatial audio with the spatial audio effect when the user is within the threshold distance. Beyond the threshold distance, audio mixing may be provided, with increasing distance from the virtual audio capture location 513, to decrease the level of the spatial audio presented with the spatial audio effect, thereby having a discrete perceived direction of origin, and to increase the level of the spatial audio presented with the ambient audio effect. In one or more examples, this increase and decrease of levels may be achieved by audio volume mixing of the spatial audio with spatial audio effect versus the same spatial audio with the ambient audio effect. Thus, the volume of spatially presented spatial audio may be decreased with distance while the volume of ambient presented spatial audio may be increased with distance. In one or more other examples, the transition region is provided by way of the spatial audio effect being configured to increase, with increasing distance from location 513, the range of directions from which the audio content of the spatial audio is perceived to originate until it is heard as originating from all directions and thus comprises ambient audio.

The increase in spatial audio presented with the ambient audio effect with distance from the virtual audio capture location may be controlled by a first function. The decrease in spatial audio presented with the spatial audio effect with distance from the virtual audio capture location may be controlled by a second function. The functions used to control how much to increase or decrease the spatial audio levels may be linear functions or any other continuous function to map the presentation of the spatial audio with the spatial/ambient audio effects to virtual distance from the virtual audio capture location 513. The first/second function used to decrease the presentation of the spatial audio with the spatial audio effect may be the same or different to the function used to increase the presentation of the spatial audio with the ambient audio effect.

In the above example, the spatial audio comprises sounds that, by virtue of the directional information, are associated with different directions from the virtual audio capture location.

With reference to FIG. 5, when the user moves in the direction of arrow 514 from the first viewing position 503 to the second viewing position 507 the direction towards the imagery 304 and imagery 504 shifts to the right. The sounds from the musician 204 and singer 404 are therefore advantageously changed from spatial audio to ambient audio as described above. However, for a sound that originated from location 515 (shown in the real world in scene 400 of FIG. 4 and the VR space 500 of FIG. 5) the direction towards the sound on movement in the direction of arrow 514 is unchanged. Thus, for sources of sound that are on an opposed side of the virtual audio capture location 515 to the user's virtual location 507, the direction for those sounds may not change much, such as less than a threshold change in direction there-towards. Accordingly, while in the above example, all of the sounds that make up the spatial audio were presented with a spatial audio effect or ambient audio effect based on the threshold distance 511 (subject to any optional audio mixing in the transition region), in this example, only a subset of the sounds of the spatial audio may be presented in this way. Thus, in one or more examples, sounds of the spatial audio where the directional information indicates that the sound's origin is on an opposed side of the virtual audio capture location, within a direction threshold of directly opposed, relative to a current virtual location of the user, are presented with the spatial audio effect while the remaining sounds of the spatial audio are presented with the ambient audio effect even when the current virtual location is greater than the threshold distance 511 from the virtual audio capture location 513. In other words, the directional information of sounds outside the subset is indicative of them having an origin direction within a direction threshold, shown by arc 517, of a direction 516 extending from the virtual location of the user 517 and to the virtual audio capture location 513 when the virtual location is beyond the threshold distance from the virtual audio capture location.

Figure 6:
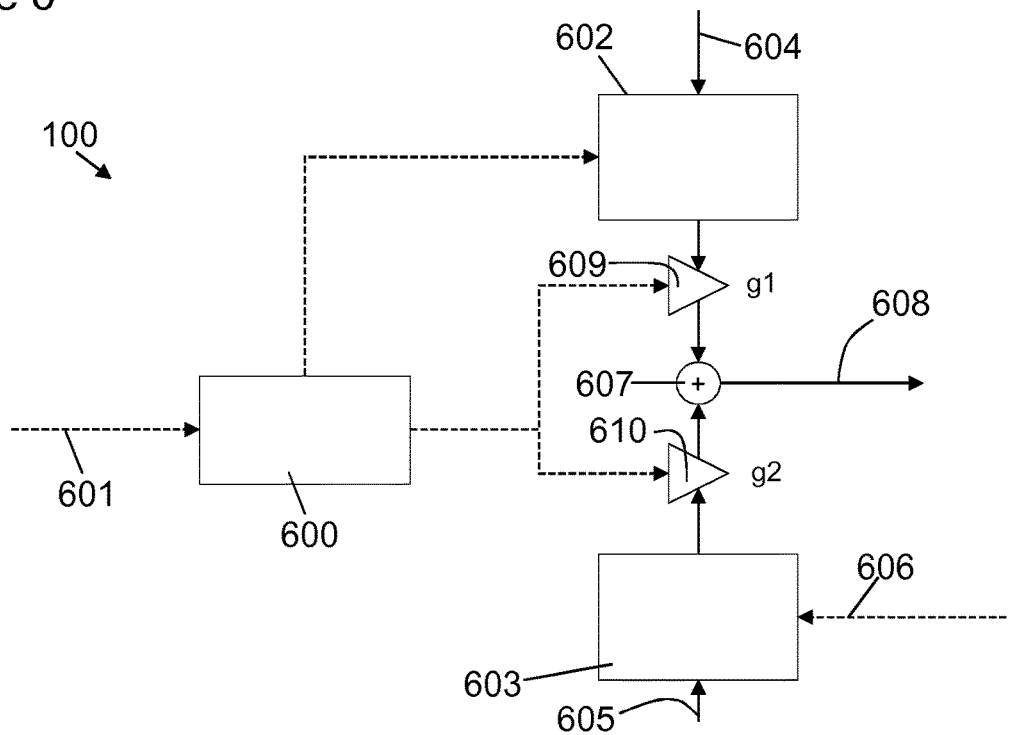
FIG. 6 shows a block diagram showing an example embodiment of the apparatus.

FIG. 6 shows a block diagram showing an example embodiment of at least part of the apparatus 100 that provides for spatial audio mixing. In one or more examples, the apparatus 100 comprises control logic 600 configured to receive the current virtual location of the user at 601. The VR apparatus 101 may provide the current virtual location. The apparatus further includes a spatial audio processing block 602 and an individual audio processing block 603. The spatial audio processing block receives the audio content of the spatial audio and directional information at 604. The individual audio processing block 603 receives the audio content from VR content obtained from the individual microphones 410 at 605. The particular source location information may be received at 606. Thus, the audio from the spatial audio processing block 602 has its gain controlled by gain controller 609 and is combined with the audio from the individual audio processing block 603 after its gain is controlled by gain controller 610, the combining provided by mixer 607 to provide mixed audio 608 for presentation by the VR apparatus 101. The control logic 600 provides for control of the gain controllers 609, 610 to provide for a transition from the spatial audio presented with a spatial audio effect and the spatial audio presented with the ambient audio effect (plus any other individual audio). Accordingly, the apparatus 100 may provide for control of the gain of the spatial audio presented with a spatial audio effect and the gain of the spatial audio presented with the ambient audio effect based on the distance between the virtual location 503, 507 and the virtual audio capture location 513 with reference to the threshold 511.

FIG. 7 shows a flow diagram illustrating the steps of, in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location, based on 700 a virtual location of a user in the virtual reality space relative to a virtual audio capture location in the virtual reality space that corresponds to the audio capture location in the scene;
   providing 701 for audible presentation of the spatial audio when the virtual location is within a threshold distance of the virtual audio capture location with the spatial audio effect such that the one or more sounds are perceived to originate from one or more directions in the virtual reality space in corresponding to the directional information; and providing for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

FIG. 8 illustrates schematically a computer/processor readable medium 800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location;
   based on a virtual location of a user in the virtual reality space relative to a virtual audio capture location in the virtual reality space that corresponds to the audio capture location in the scene;
   provide for audible presentation of the spatial audio when the virtual location is within a threshold distance of the virtual audio capture location with a spatial audio effect such that the one or more sounds are perceived to originate from one or more directions in the virtual reality space corresponding to the directional information; and
   provide for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

2. The apparatus of claim 1, wherein the ambient audio effect is configured to audibly present the one or more sounds of the spatial audio such that they are perceived as originating from one of all directions around the user and a plurality of directions.

3. The apparatus of claim 1, wherein the VR content includes individual audio comprising audio from a particular source of sound in the scene wherein the spatial audio also includes, at least in part, audio from the same particular source of sound in the scene, the apparatus caused to provide for audible presentation of the individual audio at a higher volume relative to the spatial audio when the virtual location is beyond the threshold distance relative to when the virtual location is within the threshold distance.

4. The apparatus of claim 3, wherein the individual audio is associated with particular source location information that defines the location of the particular source of sound in the scene and, based on said particular source location information and a current viewing direction and the virtual location of the user, the individual audio is provided for audible presentation with the spatial audio effect configured to position the audio in the virtual reality space such that it is perceived to originate from a direction in the virtual reality space corresponding to the particular source location information.

5. The apparatus of claim 1, wherein the threshold distance defines a transition region comprising a region of virtual reality space in which the ratio of spatial audio provided for audible presentation with the spatial audio effect and the spatial audio provided for audible presentation with the ambient audio effect is varied as a function of distance from the virtual audio capture location.

6. The apparatus of claim 1, wherein a gain of the spatial audio provided for audible presentation with the spatial audio effect is decreased with increasing distance of the virtual location of a user from the virtual audio capture location.

7. The apparatus of claim 1, wherein a gain of the spatial audio provided for audible presentation with the ambient audio effect is increased with increasing distance of the virtual location of a user from the virtual audio capture location.

8. The apparatus of claim 1, wherein the spatial audio effect uses one of a head related transfer function and vector-base amplitude panning to audibly present the spatial audio.

9. The apparatus of claim 1, wherein the apparatus is caused to provide for audible presentation of the spatial audio when the virtual location is beyond the threshold distance from the virtual audio capture location such that all of the one or more sounds captured by the spatial audio capture device are audibly presented:
without the spatial audio effect or
with the ambient audio effect such that said sounds are perceived without a specific direction of origin.

10. The apparatus of claim 1, wherein the apparatus is caused to provide for audible presentation with the spatial audio effect of the one or more sounds of the audio outside the subset where the directional information of said one or more sounds is indicative of a direction within a direction threshold of a direction extending from the virtual location of the user and the virtual audio capture location when the virtual location is beyond the threshold distance from the virtual audio capture location.

11. A method comprising,
in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location,
based on a virtual location of a user in the virtual reality space relative to a virtual audio capture location in the virtual reality space that corresponds to the audio capture location in the scene;
providing for audible presentation of the spatial audio when the virtual location is within a threshold distance of the virtual audio capture location with the spatial audio effect such that the one or more sounds are perceived to originate from one or more directions in the virtual reality space in corresponding to the directional information; and
providing for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

12. The method of claim 11, wherein the ambient audio effect is configured to audibly present the one or more sounds of the spatial audio such that they are perceived as originating from one of all directions around the user and a plurality of directions.

13. The method of claim 11, wherein the VR content includes individual audio comprising audio from a particular source of sound in the scene wherein the spatial audio also includes, at least in part, audio from the same particular source of sound in the scene, the apparatus caused to provide for audible presentation of the individual audio at a higher volume relative to the spatial audio when the virtual location is beyond the threshold distance relative to when the virtual location is within the threshold distance.

14. The method of claim 13, wherein the individual audio is associated with particular source location information that defines the location of the particular source of sound in the scene and, based on said particular source location information and a current viewing direction and the virtual location of the user, the individual audio is provided for audible presentation with the spatial audio effect configured to position the audio in the virtual reality space such that it is perceived to originate from a direction in the virtual reality space corresponding to the particular source location information.

15. The method of claim 11, wherein the threshold distance defines a transition region comprising a region of virtual reality space in which the ratio of spatial audio provided for audible presentation with the spatial audio effect and the spatial audio provided for audible presentation with the ambient audio effect is varied as a function of distance from the virtual audio capture location.

16. The method of claim 11, wherein a gain of the spatial audio provided for audible presentation with the spatial audio effect is decreased with increasing distance of the virtual location of a user from the virtual audio capture location.

17. The method of claim 11, wherein a gain of the spatial audio provided for audible presentation with the ambient audio effect is increased with increasing distance of the virtual location of a user from the virtual audio capture location.

18. The method of claim 11, wherein the spatial audio effect uses one of a head related transfer function and vector-base amplitude panning to audibly present the spatial audio.

19. The method of claim 11, wherein the apparatus is caused to provide for audible presentation of the spatial audio when the virtual location is beyond the threshold distance from the virtual audio capture location such that all of the one or more sounds captured by the spatial audio capture device are audibly presented:
without the spatial audio effect or
with the ambient audio effect such that said sounds are perceived without a specific direction of origin.

20. A non-transitory computer readable medium comprising program instructions stored thereon for performing at least the following:
in respect of virtual reality content captured of a scene for presentation to a user in a virtual reality space for viewing in virtual reality, the virtual reality content comprising spatial audio captured by at least one audio capture device located at an audio capture location in the scene, the spatial audio comprising audio from the scene with directional information defining one or more directions towards sources of one or more sounds of the audio from the audio capture location,
based on a virtual location of a user in the virtual reality space relative to a virtual audio capture location in the virtual reality space that corresponds to the audio capture location in the scene;
providing for audible presentation of the spatial audio when the virtual location is within a threshold distance of the virtual audio capture location with the spatial audio effect such that the one or more sounds are perceived to originate from one or more directions in the virtual reality space in corresponding to the directional information; and
providing for audible presentation of the spatial audio when the virtual location is beyond the threshold distance from the virtual audio capture location such that at least a subset of the one or more sounds are audibly presented without the spatial audio effect and with an ambient audio effect such that said sounds are perceived without a specific direction of origin.

* * * * *